Oct. 7, 1952        E. E. AYLOR        2,612,927
BLIND FASTENER
Filed Aug. 31, 1950        2 SHEETS—SHEET 1
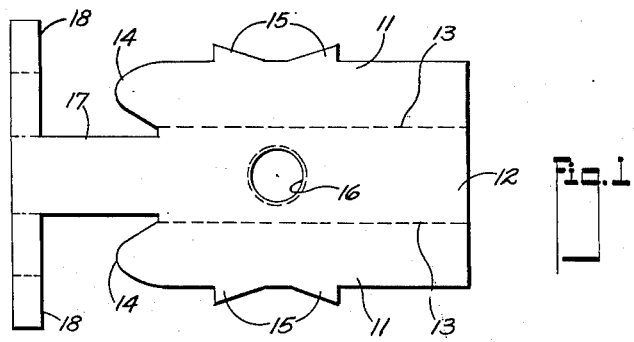
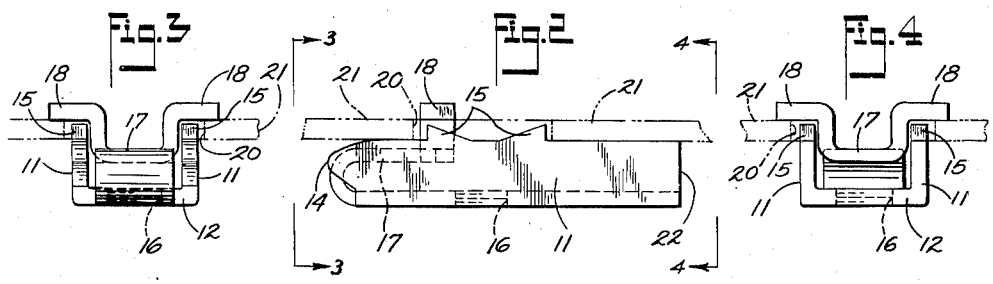
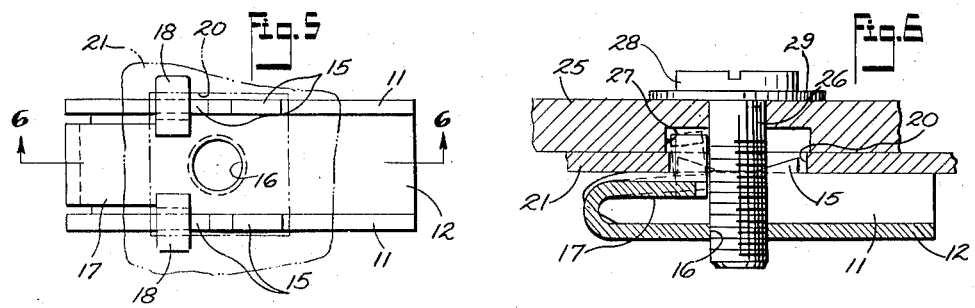
INVENTOR.
ELMO E. AYLOR
BY J. D. Douglass
HIS ATTORNEY Oct. 7, 1952     E. E. AYLOR     2,612,927
BLIND FASTENER
Filed Aug. 31, 1950     2 SHEETS—SHEET 2
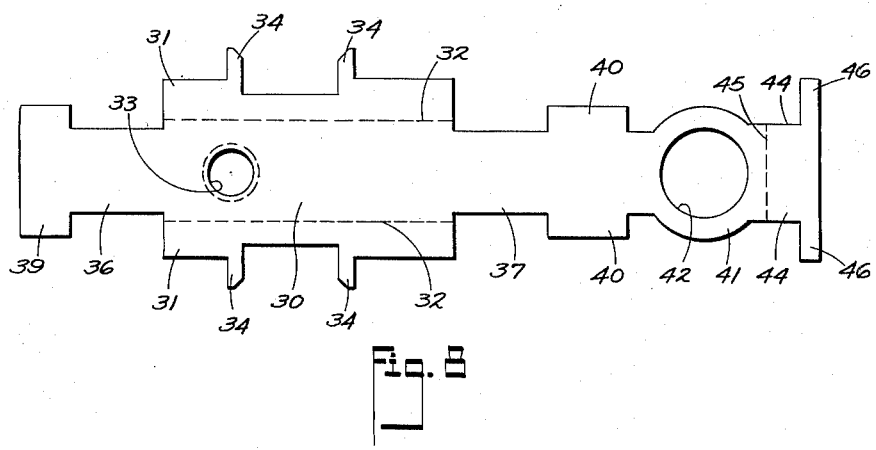
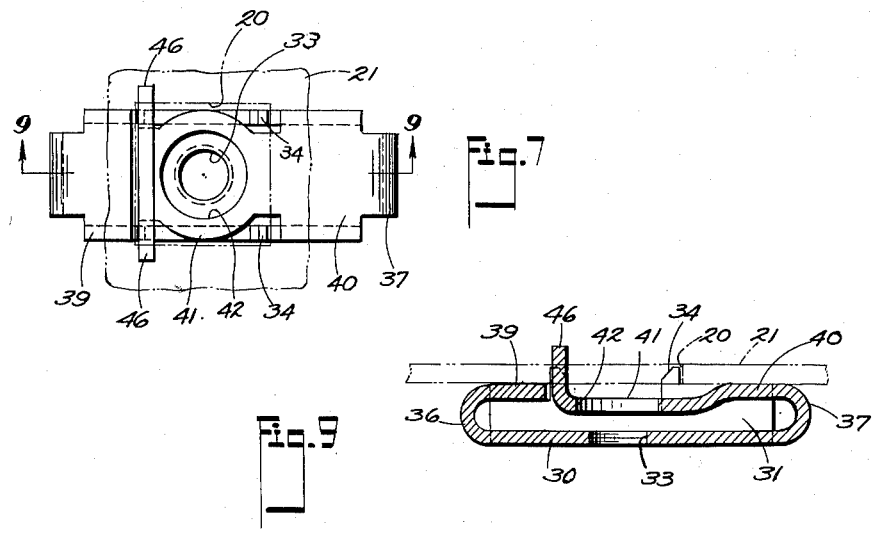
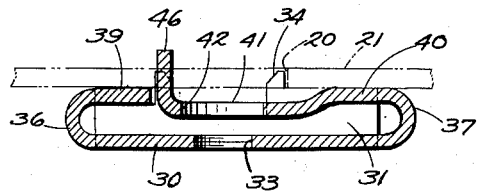
INVENTOR.
ELMO E. AYLOR
BY J. D. Douglas
HIS ATTORNEY Patented Oct. 7, 1952

2,612,927

UNITED STATES PATENT OFFICE 2,612,927

BLIND FASTENER

Elmo E. Aylor, Chicago, Ill., assignor to Admiral Corporation, Chicago, Ill., a corporation of Delaware Application August 31, 1950, Serial No. 182,578

4 Claims. (Cl. 151—41.75)

This invention relates to fasteners, and more particularly to a blind fastener adapted to retain itself in place in a blind opening in a sheet metal structure or the like.

Most previous fasteners which were used to fasten material to a structure having a blind hole therein, that is, one which is inaccessible for the purpose of using a nut, have been of a type where the screw or bolt has been threaded into the holding device before the device was inserted in place. With this type of fastener, if the screw or bolt were withdrawn, the fastener or nut dropped down within the structure and was lost.

Other types of fastener have been designed to overcome this fault and particularly for use with sheet metal structures. These fasteners, however, each require two holes for their use; one through which the fastener is inserted and the edge of which is grasped by the fastener, and the second through which the bolt or screw extends.

With my new fastener, it is necessary to cut or punch only one rectangular hole for each fastener. Moreover, the device is usable with a range of different thicknesses of material. Turning of the device is prevented by engagement of a part of the fastener with the edges of the rectangular opening, and the device may be inserted and removed by a simple operation.

Still further advantages of my invention will become apparent by reference to the following figures and description which form a part of this specification.

In the drawings:

Fig. 1 is a plan view of the blank from which one embodiment of my new fastener is formed;

Fig. 2 is a side elevational view of the fastener showing the sheet metal structure with which the fastener is used in dot-dashed lines;

Fig. 3 is an end elevational view from line 3—3 of Fig. 2;

Fig. 4 is an end elevational view from line 4—4 of Fig. 2;

Fig. 5 is a top plan view of the fastener showing the sheet metal structure similarly to Fig. 2;

Fig. 6 is a sectional view along line 6—6 of Fig. 5 showing the mode of fastening;

Fig. 7 is a top plan view of a second embodiment of my invention;

Fig. 8 is a developed view of the blank from which the second embodiment is formed; and Fig. 9 is a sectional view along line 9—9 of Fig. 7.

Briefly, my invention comprises a fastener for insertion into a rectangular hole in a structure. The fastener is stamped from a sheet of metal and is formed to engage the inside of the sheet metal structure and be held there by a pair of wings formed on the fastener which extend beyond its sides and engage the outer surface of the structure. Lugs engaging the edges of the rectangular hole prevent the fastener from turning. Two embodiments are shown differing slightly in form and not at all in function.

More specifically, and with reference to the drawings, the invention is embodied in a fastener formed from the blank shown in Fig. 1. Two identical sides 11 are bent upward from the back 12 at right angles thereto along the dotted lines marked 13. These sides are formed with rounded ends 14 for more easy insertion into the opening, as will appear hereinafter. A pair of abutment lugs 15 are also stamped out as a part of the sides 11 and when the device is inserted, these lugs engage the sides of the opening to prevent turning of the device in the aperture. A hole 16 is formed in the back 12 to receive a screw. It is apparent that this could be a tapped hole to receive an ordinary machine screw or could be formed to receive any other type of special screw which it might be desired to use.

In the blank a tongue 17 extends from the back 12 adjacent the rounded ends 14 of the sides. In the completed device, this tongue is bent upward and over the back 12 and in spaced relation thereto but between the sides 11 (Fig. 12). The wings 18 on the tongue 17 extend beyond the sides 11 and would therefore interfere with the sides if left flat. However, to avoid this interference and to provide for holding the device in place in a structure of considerable thickness, these wings are bent to the shape best shown in Figs. 3 and 4. As shown there, the wings 18 extend upward between the sides 11 and then outward above the lugs 15 and beyond the sides. It is apparent that by this construction the wings 18 are resiliently attached to the back 12 and have considerable freedom to move with respect to the rest of the device.

The fastener is designed for use in structures formed at least in part of sheet metal. A square or rectangular opening 20 is formed in the metal sheet 21 (Fig. 5). The fastener is installed in this opening by inserting first the square end 22 of the device. The lugs 15 are slid back under the inner surface of the sheet 21, as the fastener is inserted, sufficiently far to allow the rounded ends to be inserted beneath the sheet 21 on the opposite side. When these ends are pushed through the opening 20, the tongue 17 may have to be sprung slightly since the wings 18 will remain engaged with the outer surface of the sheet. This springing is fully provided by the formation of the tongue. After the ends 14 are beneath the surface, the fastener is moved to the left (Figs. 2 and 5) until the lugs 15 just clear the edges of the opening 20. At this point, the resilience of the tongue will snap the lugs up into the opening, and the fastener is ready for use. It is apparent that the rounded ends 14 will help to slide the device into the opening as it is pushed down.

One use of the device is illustrated in Fig. 6 where a second sheet 25 is fastened to the original sheet 21 by a screw 26. To accomplish this fastening, it is necessary only to thread the screw into the hole 16 provided for it. The lugs 15 will prevent rotation of the device by their engagement with the edges of the opening 20. Movement in and out of the opening is prevented by engagement of the wings 18 with the outer surface and the sides 11 with the inner surface of the metal sheet 21. The hole 27 in the sheet 25 for the screw may be made large enough to surround the wings 18, or a relieved or countersunk opening may be provided. In all cases, the head 28 of the screw 26 should be large enough to extend over the hole 27 or a sufficiently large washer 29 may be used.

The second embodiment is illustrated in Figs. 7-9. In this embodiment the sides 31 are folded up from the back 30 along the dotted lines marked 32. A screw receiving hole 33 is provided, formed in the back 30. Lugs 34 of slightly different formation than those of the first embodiment, for reasons which will be apparent hereinafter, are formed on the sides 31.

In the blank for this embodiment, tongues 36 and 37 extend from both ends of the back 30, and in each case the tongue is bent over the back 30 and is spaced therefrom as in the prior embodiment. The tongue 36 terminates in an enlarged part 39 which, when the tongues are bent, overlies the sides 31. A similar enlarged part 40 is provided on the other tongue 37 so that on both ends, surrounding the hole 33, the fastener device presents a broad flat surface instead of two edges which will press against the sheet metal.

Extending from the enlarged part 40 is a screw embracing part 41 formed with a hole 42. This part is formed in a necked down section and is enlarged around the hole 42 to provide sufficient material for proper strength. The screw embracing part 41 is depressed slightly from the enlarged parts 39 and 40 in the completed fastener. This provides additional clearance for movement of the wings as they appear in this embodiment. The enlarged part, around the hole 42, extends between the lugs 34 and is free to move within limits. Beyond the screw embracing part a neck 44 extends and is bent upward on the dotted line marked 45. The wings 46 extend transversely from this neck and since the neck is upright, the wings 46 extend transversely of the body of the fastener and are spaced therefrom.

This device is used in the same manner as the first embodiment and has all the advantages of that embodiment. In addition, certain improvements are evident in the second embodiment. The wings 26 are attached to a longer free portion and therefore are somewhat more free to move, requiring less force to install the fastener.

The parts 39 and 40 are flat surfaces which press against the metal sheet 21 instead of edges as in the first embodiment, preventing chipping of porcelain surfaces. Other advantages of either or both devices will occur to those skilled in the art.

Having thus described my invention, I am aware that numerous departures may be made therefrom without departing from the spirit or scope of my invention.

I claim:

1. A blind fastener comprising a sheet metal piece formed with a back, said back having a screw receiving hole therein, sides extending upward from said back formed with opening engaging lugs, a tongue connected to and extending over said back in spaced relation thereto and having wings extending upward and outwardly beyond the width of said back.

2. In combination with a structure having a rectangular opening therein, a fastener comprising a back adapted to be inserted through said opening, said back having a screw receiving hole formed therein, sides extending upward from said back and adapted to engage the inside of said structure on two sides of said opening, said sides being formed with lugs adapted to engage the edges of said opening to prevent rotation of said fastener, and a tongue connected to and extending over said back in spaced relation thereto and having wings adapted to extend through said opening and engage the outer surface of said structure adjacent said opening.

3. A blind fastener formed from a flat piece of sheet metal comprising a body formed of a back and two sides bent upwardly from said back, said back being formed with a screw-receiving hole, said sides having opening engaging lugs formed thereon, said sheets having at least one rounded end, a tongue extending from said back adjacent said rounded ends and bent back in spaced relation to said back between said sides, and transverse wing members formed on said tongue and bent upwardly and outwardly thus extending above and beyond said sides.

4. In combination with a structure having a rectangular opening, a blind fastener comprising a back formed with a screw receiving hole therethrough, sides bent upward from said back formed with lugs adapted to engage the edge of said opening, a tongue extending from one end of said back and bent back substantially parallel and in spaced relation to said back, at least a part of said tongue overlying said sides, a second tongue extending from the other end of said back, said second tongue also being bent back in substantially parallel spaced relation to said back, a part of said second tongue also engaging said sides, said second tongue extending over said hole and being formed with a clearance hole approximately aligned with said screw receiving hole, and a shoulder portion bent upward from said second tongue and formed with shoulders adapted to engage the outer surface of said structure.

ELMO E. AYLOR.

REFERENCES CITED

The following references are of record in the file of this patent:

UNITED STATES PATENTS

| Number | Name | Date |
| --- | --- | --- |
| 991,447 | Kennedy | May 2, 1911 |
| 1,912,100 | Rosenberg | May 30, 1933 |
| 2,302,389 | Kost | Nov. 17, 1942 |